United States Patent [19]
Castonguay

[11] 3,752,950
[45] Aug. 14, 1973

[54] APPARATUS FOR SLOTTING A CLAMPING BUSHING BY EDM

[75] Inventor: Leon H. Castonguay, Wheelwright, Mass.

[73] Assignee: Astratronics, Inc., Wheelwright, Mass.

[22] Filed: Mar. 15, 1971

[21] Appl. No.: 124,331

[52] U.S. Cl............................................. 219/69 V
[51] Int. Cl............................................. B23p 1/12
[58] Field of Search.............. 219/69 E, 69 M, 69 V

[56] References Cited
UNITED STATES PATENTS

| | | | |
|---|---|---|---|
| 2,794,110 | 5/1957 | Griffith | 219/69 V |
| 3,288,699 | 11/1966 | Trager et al. | 219/69 M |
| 3,366,771 | 1/1968 | Jackson et al. | 219/69 E |

Primary Examiner—R. F. Staubly
Attorney—Norman S. Blodgett

[57] ABSTRACT

This invention has to do with an apparatus for slotting and a clamping bushing manufactured with such apparatus and, more particularly, to a machine using the E.D.M. process for slotting workpieces and the slotted work clamping bushing or collet manufactured on said apparatus. The apparatus has a wire electrode which is moved between two rolls, and has a workholder which is relatively movable linearly toward and away from the electrode and rotatable about an axis passing through the electrode. Cam means is provided to synchronize the two modes of motion. The bushing is formed of a right circular cylindrical tube, the sides of which are slotted. The slots are at some points parallel and at some points skewed to the generatrices.

4 Claims, 6 Drawing Figures

PATENTED AUG 14 1973        3,752,950
SHEET 1 OF 2
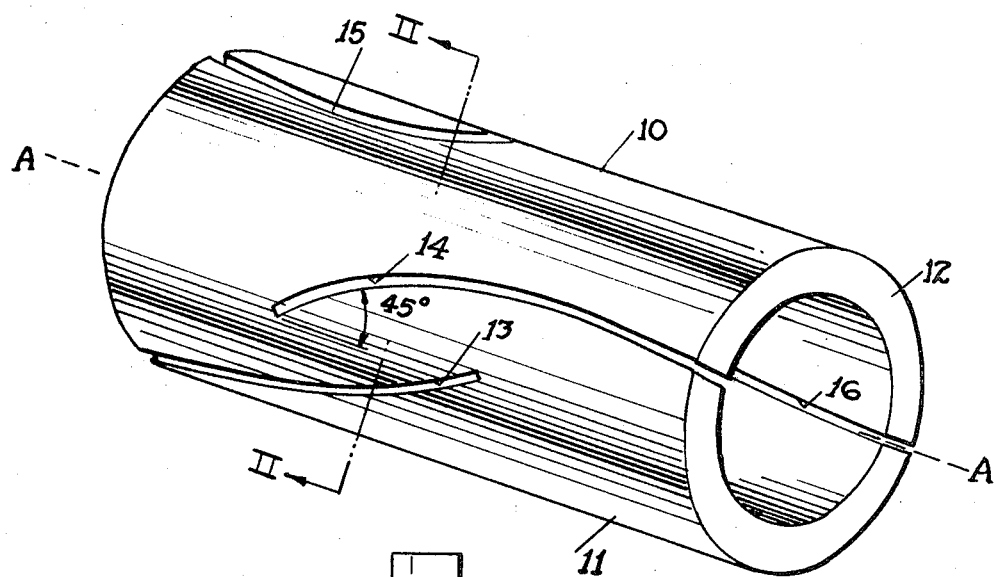
Fig.1.
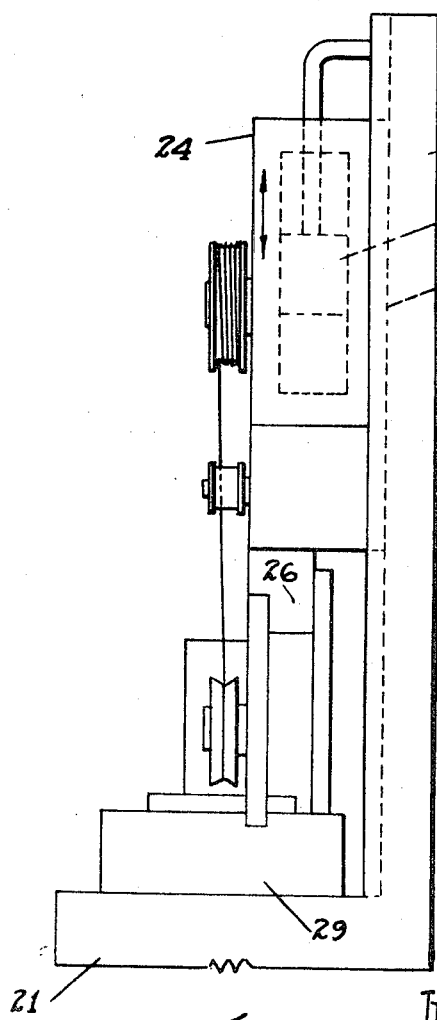
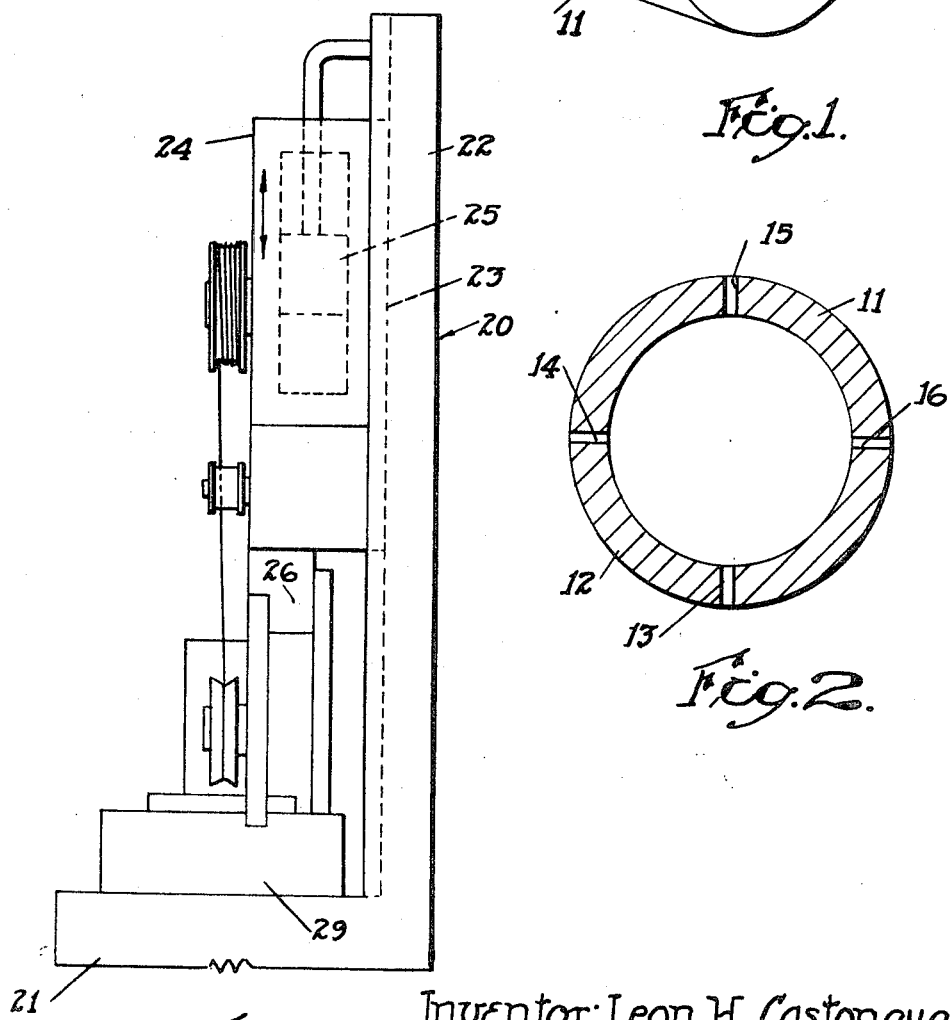
Fig.2.
Fig.3.
Inventor: Leon H. Castonguay
BY Howard Blodgett
ATTORNEY

APPARATUS FOR SLOTTING A CLAMPING BUSHING BY EDM

BACKGROUND OF THE INVENTION

In the art of machining, the process of slotting is one which presents a considerable number of problems. In the past, this operation has most often been carried on with a milling machine using an end mill. Since an end mill is supported in a cantilevered manner with a free end, the machining operation causes the mill to bend and feed sideways of the direction of feed. This makes it very difficult to obtain a straight slot and to obtain one with a good finished surface with any amount of feed. That is to say, if the rate of formation of the slot is as fast as conventional machining operations, the slot cannot be formed properly with an end mill. Because of the difficulty in controlling the amount of bending of the end mill, it is also difficult to produce a slot with other than a straight line configuration, because the bending forces would vary during the operation and change the amount of bending. For somewhat the same reasons, the articles that are manufactured with slots are limited in their construction as to the manner in which the slots are laid out. A straight slotted collet or clamping bushing, for instance, suffers from the deficiency that it is difficult to properly clamp fluted tools or hexagonal screw machine stock (if the bushing is being used in the head of a screw machine). These and other difficulties experienced with the prior art devices have been obviated in a novel manner by the present invention.

It is, therefore, an outstanding object of the invention to provide apparatus for slotting in which the configuration of the slot produces no force on the forming tool that would cause the tool to deviate from a pre-selected slotting pattern.

Another object of this invention is the provision of an apparatus for slotting which permits the production of a very thin slot.

A further object of the present invention is the provision of a clamping bushing provided with slots of a non-axial configuration.

It is another object of the instant invention to provide a clamping bushing capable of producing even clamping of objects of non-cylindrical shape.

A still further object of the invention is the provision of a clamping collet capable of holding fluted tools, hexagonal stock, and the like and maintaining the same in a concentric position.

It is a further object of the invention to provide apparatus for performing E.D.M. operations where a thin path of material is to be removed from a workpiece.

It is a still further object of the present invention to provide an apparatus for producing slots using the E.D.M. process in which the electrode surface is constantly renewed.

Another object of the invention is the provision of apparatus for E.D.M. forming of machine tools using elongated wire passing from one spool to another and having means for assuring that the speed of the wire remains constant at all times.

With these and other objects in view, as will be apparent to those skilled in the art, the invention resides in the combination of parts set forth in the specification and covered by the claims appended hereto.

SUMMARY OF THE INVENTION

In general, the invention relates to an apparatus for slotting having an elongated flexible electrode having a first roll on which the electrode is wound and from which the electrode passes, and having a second roll to which the electrode passes for winding. A fixture is provided for holding a workpiece in the path of the electrode as it passes from the first roll to the second roll, means is provided to connect the electrode and the workpiece to electrical sources of opposite polarity, and means is provided for immersing the workpiece and electrode in an working fluid for electric discharge machining. The fixture is operated to move the workpiece in a pre-determined pattern relative to the electrode. The clamping bushing can be manufactured on the apparatus, wherein the bushing has a generally tubular main body with a wall concentric with a central axis. A plurality of slots extend entirely through the wall, each slot extending from one end of the body and terminating before the other end is reached, the slot starting on a given generatrix of the body and crossing a plurality of generatrices as it progresses toward the other end of the body.

BRIEF DESCRIPTION OF THE DRAWINGS

The character of the invention, however, may be best understood by reference to one of its structural forms, as illustrated by the accompanying drawings, in which:

FIG. 1 is a perspective view of a clamping bushing making use of the principles of the present invention, FIG. 2 is a sectional view of the bushing taken on the line II—II of FIG. 1, FIG. 3 is a side elevational view of an apparatus embodying the principles of the present invention.

DESCRIPTION OF THE PREFERRED EMBODIMENT

Figure 4:
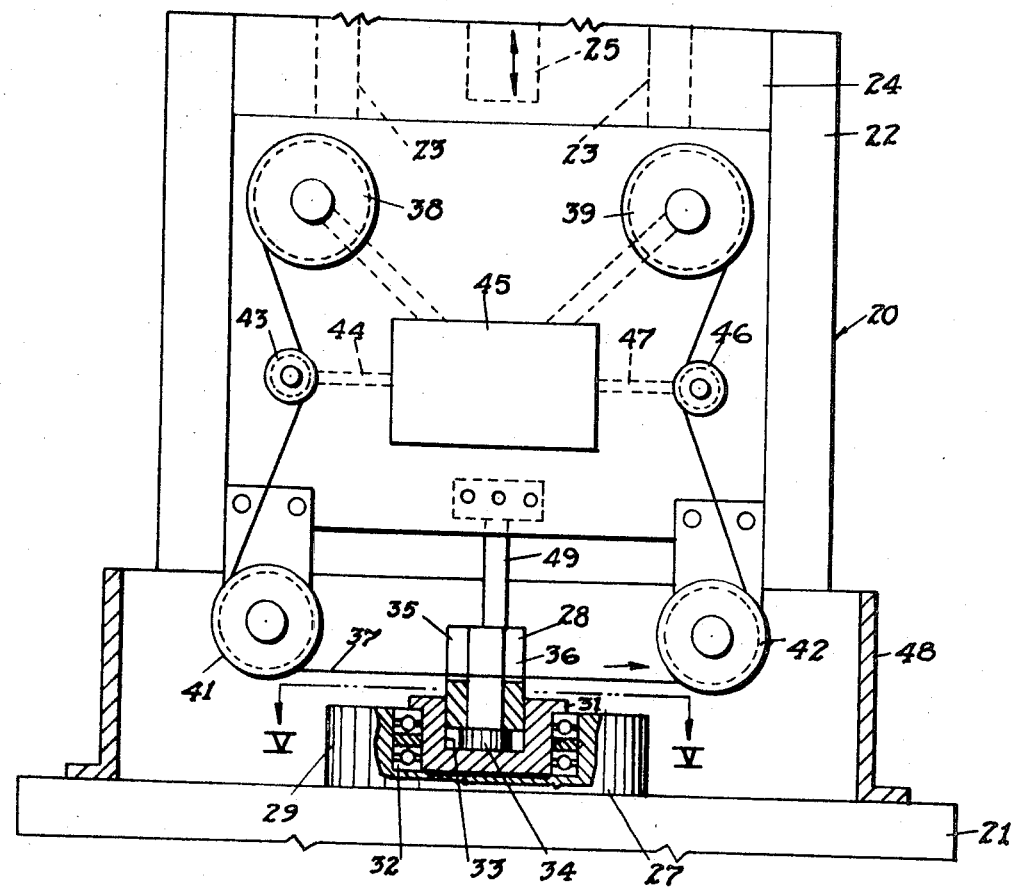
FIG. 4 is a front elevational view of the apparatus.

Referring first to FIG. 1, wherein is shown a product manufactured on the apparatus of the invention. A clamping bushing, indicated generally by the reference numeral 10, is shown as having a generally tubular main body 11 of cylindrical conformation. The body has a wall 12 which is concentric with a central axis A—A. Through the wall extend four slots 13, 14, 15, and 16. Each slot extends from one end of the body and terminates before the other end is reached and the slots are alternately arranged. For instance, referring to the drawing, it can be seen that the slots 14 and 16 are diametrically opposite one another and extend from the right-hand end of the body, while the slots 13 and 15, which are diametrically opposed, extend from the left-hand end of the body. Furthermore, referring to the fact that the outer surface of the body 11 is cylindrical, each slot starts on a generatrix of the cylinder, but progresses away from that generatrix and crosses a plurality of generatrices as it progresses toward the other end of the body. In other words, as the slot progresses in the axial direction, it also progresses circumferentially, so that the end part of the slot lies at a substantial angle to a plane passing through the axis A—A and the point of start of the slot. In the drawing, for instance, observing slot 14, it can be seen that it progresses parallel with the axis A—A along a generatrix for a short while, but then is bent and starts to curve around the cylinder, so that at the terminating end its general direction is at an angle of about 45° to a plane through the axis A—A and through the point of starting at the right-hand end of the body.

Furthermore, it can be seen that the various slots are provided with different "hand". Looking directly at the right-hand end of the body, it might be said that the slots 14 and 16 have a left-hand thread or helix, while the slots 13 and 15 have a right-hand helix. It can be seen that a bushing of this construction when used for grasping either a tool or a piece of stock in a screw machine is capable of squeezing the entire periphery of the article held. For instance, if a drill with a flute is grasped in this bushing and the bushing is tightened up by being held in a tool holding collar, the entire body will shrink inwardly and grasp the tool. The lands of the threads or flutes on the drill will be extending at a substantial angle to the helices formed by the slots 13, 14, 15, and 16, so that the drill will be well centered and there will be no run-out. In a similar way, if this bushing is used in the head of a screw machine and the stock being operated on extends through such a bushing, the bushing will grasp hexagonal stock as well as round stock in such a way as to lock it firmly with no danger of it moving in the clamp when machining forces are applied to the protruding end of the stock. As a matter of fact, with the present bushing there will be a tendency to push the stock out of the bushing instead of retract it. In other words, even though the bushing operates very effectively with round stock that exactly fits the inside diameter of the body, it is particularly useful with non-circular stock or tools because it is practically impossible for the high spots of the stock or tool to reside in a groove.

Figures 5, 6:
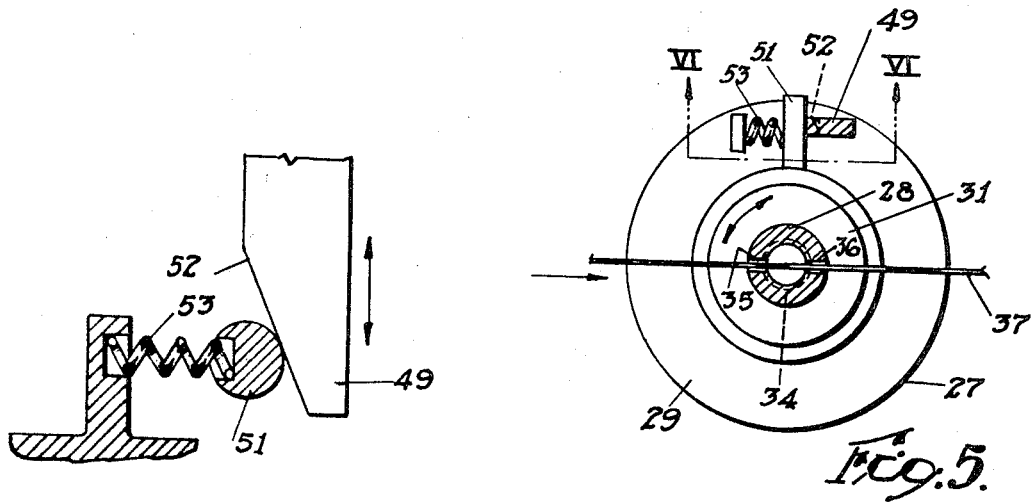
FIG. 5 is a horizontal sectional view of the apparatus taken on the line V—V of FIG. 4.
FIG. 6 is a sectional view of the apparatus taken on the line VI—VI of FIG. 5.

FIGS. 3, 4, and 5 show the apparatus for constructing the bushing 10. The apparatus 20 makes use of the electrical discharge machining principle commonly known as "E.D.M.". From a base 21 of the machine extends a vertical column 22 which is formed with vertical ways 23 on which are slidably mounted a toolhead 24. This head is actuated up and down by a hydraulic cylinder 25 and carries at its lower end a tool 26 which lies over a workhead 27 and which carries a workpiece 28. This workpiece is shown for the purpose of illustration as being similar to the bushing 10 described above. The workhead 27 consists of a fixed body 29 which is mounted on an upper horizontal surface of the base 21 in which is carried a rotary holder 31 carried in suitable bearings 32 in the body 29. Finally, the holder 31 is provided with a recess 33 in which the workpiece 28 is carried. The recess is provided with a central boss 34 on which the workpiece rests. In the illustration, the workpiece 28 is being formed with diametrically opposed slots 35 and 36 through its wall by means of a wire-like electrode 37. This electrode is stored on a first roll 38 and a second roll 39 mounted on the tool 26; the electrode 37 passes from one roll to the other during the machining operation. The bottom of the tool 26 is provided with two guide rolls 41 and 42 around which the electrode passes on its way through the slots 35 and 36. Between the roll 38 and the roll 42 is a capstan 43 driven through transmission means 44 by a D.C. motor 45. Between the roll 42 and the roll 39 is a capstan 46 which is driven by a transmission means 47 by the same motor 45. When the electrode is being driven in the direction shown in the drawings (that is to say, from left to right or from the roll 38 to the roll 39), the capstan 43 is operated to act as a drag on the electrode which extends around the capstan with several turns and is actually driven by the capstan 46 around which the electrode also passes with several turns. When the direction of the electrode is reversed, the function of the two capstans is also reversed. The motor 45 is arranged in such a way as to maintain the speed of the electrode as it passes through the workpiece at a constant speed, irrespective of the amount of stored electrode on the rolls 38 and 39. The rolls 38 and 39 are connected to the motor 45 to drive whichever one is receiving the electrode to maintain an even, tight winding of the electrode about the roll, but with insufficient torque to cause any driving action, since it is the capstans that are to control the force and speed of the electrode. In other words, the roll 38 or 39 is only driven with sufficient torque to take up slack in the electrode after it passes over either the capstan 43 or the capstan 46.

Finally, the operating area of the apparatus is provided with a surrounding receptacle 48 which can be filled with the working fluid used in the E.D.M. process. The electrode 37 is normally connected to the high voltage side of the electrical source, while the workpiece 28 is grounded through the workhead 27 and the base 21 of the machine.

In FIGS. 4 and 5 it can be seen that the tool 26 is provided with a downwardly-extending cam 49 which engages a protuberance 51 extending radially from the rotating tool holder 31. The cam 49 is provided with an inclined surface that serves to turn the holder 31 through an angle which is determined by the desired conformation of the slots. By selecting the surface 52 of the cam properly, the cam will push the protuberance 51 against the pressure of a spring 53 to form the slot in the desired manner as the toolhead 24 descends vertically carrying the electrode 37 with it at a preselected feed rate.

The details of the operation of the cam 49 on the finger 51 are shown in FIG. 6. It can be seen that the up-and-down motion of the cam 49 causes the cam surface 52 to press the protuberance 51 to the left in FIG. 6 when the cam moves downwardly. When the cam moves upwardly, the spring 53 returns the protuberance to its former position. It is a very simple matter to construct the shape of the cam surface 52 to provide the desired metal removal action. Presumably, the tool 26 moves downwardly in a linear fashion, but the rotation of the holder 31 need not be linear and so that it is possible to obtain almost any configuration of slot 35 and 36. The rate of material removal during the slotting operation depends, of course, on the nature of the working fluid held within the receptacle 48, on the rate of feed of the tool 26, and on the rate of passage of the electrode 37 through the work area. Another determining factor, of course, is the diameter of the electrode 37. It is possible, for instance, to use a very thin wire and obtain a very narrow slot. In the past, of course, the slotting width has been limited by the fact that a thin slot would require a very small diameter milling tool. Such a tool has practically no resistance to bending, so that it has been almost impossible to form narrow slots except with feed rates that were extremely small, so that it was substantially a toolroom operation. No great amount of production was possible.

In practice, wires as thin as 0.002 inches have been used to obtain extremely thin slots with the present invention. The apparatus which is used with the motor 45 assures that the electrode speed is the same at all times, irrespective of the amount of wire that has accumulated on the rolls 38 and 39; this control is well-known in the art and needs no further description except to say that the motor is operated by direct current and is suitably controlled to maintain the peripheral speeds of the capstans 43 and 46 at the desired value.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. An apparatus for slotting, comprising
   a. an elongated flexible electrode,
   b. a first roll on which the electrode is wound and from which the electrode passes,
   c. a second roll to which the electrode passes for winding thereon,
   d. a fixture for holding a workpiece in the path of the electrode as it passes from the first roll to the second roll, so that the workpiece may be rotated about an axis which intersects the electrode,
   e. means connecting the electrode and the workpiece to electrical source of opposite polarity,
   f. means immersing the workpiece and electrode in working fluid for electric discharge machining,
   g. means for moving the workpiece and the electrode toward one another, and
   h. means for rotating the workpiece as a function of of the distance between the workpiece and the electrode;
   i. said first roll and said second roll being mounted on a vertically movable toolhead.

2. Apparatus as recited in claim 1, wherein the fixture is mounted on a fixed base, and wherein a cam is mounted on the toolhead and engages the fixture to provide the predetermined pattern of movement of the workpiece relative to the electrode.

3. Apparatus as recited in claim 2, wherein a first protuberance is provided extending from the base, a second protuberance is provided extending from the fixture, means is provided to bias the first protuberance away from the second protuberance and the various elements being positioned so that the cam moves the second protuberance with respect to the second protuberance and the workpiece and electrode are moved relative to one another.

4. Apparatus as recited in claim 1, wherein means are provided to move the electrode at constant linear velocity from one roll to the other.

* * * * *